United States Patent
Kumar

(10) Patent No.: US 8,055,652 B1
(45) Date of Patent: Nov. 8, 2011

(54) DYNAMIC MODIFICATION OF XPATH QUERIES

(75) Inventor: Arun Kumar, Bangalore (IN)

(73) Assignee: Sonoa Networks India (PVT) Ltd., Bangalore (IN)

( * ) Notice: Subject to any disclaimer, the term of this patent is extended or adjusted under 35 U.S.C. 154(b) by 366 days.

(21) Appl. No.: 12/056,299

(22) Filed: Mar. 27, 2008

(51) Int. Cl.
*G06F 7/00* (2006.01)

(52) U.S. Cl. ...................................... 707/716

(58) Field of Classification Search .................. 707/716
See application file for complete search history.

(56) References Cited

U.S. PATENT DOCUMENTS

2007/0005657 A1* 1/2007 Bohannon et al. ............ 707/200
2007/0208769 A1 9/2007 Boehm

OTHER PUBLICATIONS

Author: Yanlei Diao, Michael J. Franklin Title: "High-Performance XML Filtering: An Overview of YFilter" 2003.
Author: Yanlei Diao, Michael J. Franklin, Hao Zhang, Peter M. Fischer, Mehmet Altinel Title: "Path Sharing and Predicate Evaluation for High-Performance XML Filtering" Dec. 2003 ACM Transactions on Database Systems (TODS), vol. 28 Issue 4 Publisher: ACM.

* cited by examiner

*Primary Examiner* — Etienne Leroux
*Assistant Examiner* — Ajith Jacob
(74) *Attorney, Agent, or Firm* — Kanika Radhakrishnan; Evergreen Valley Law Group, P.C.

(57) ABSTRACT

Modifying Xpath queries dynamically during an ongoing Xpath evaluation. A modification request comprising at least one Xpath query in response to an input is received in an ongoing Xpath evaluation on an online stream of XML messages. A current generation of Nondeterministic Finite Automaton (NFA) is generated and the branches starting from the root node are identified according to the modification request. The identified branches are copied and modified to create a new generation of NFA. New generation of NFA is used for subsequent Xpath evaluations.

17 Claims, 6 Drawing Sheets

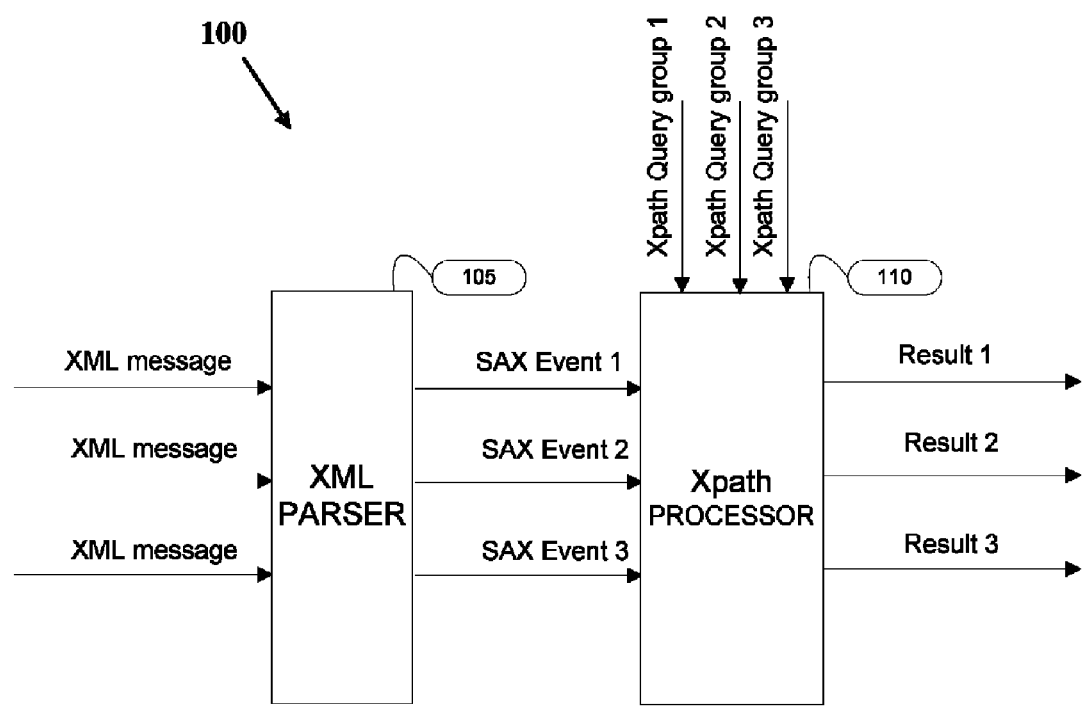
FIG: 1

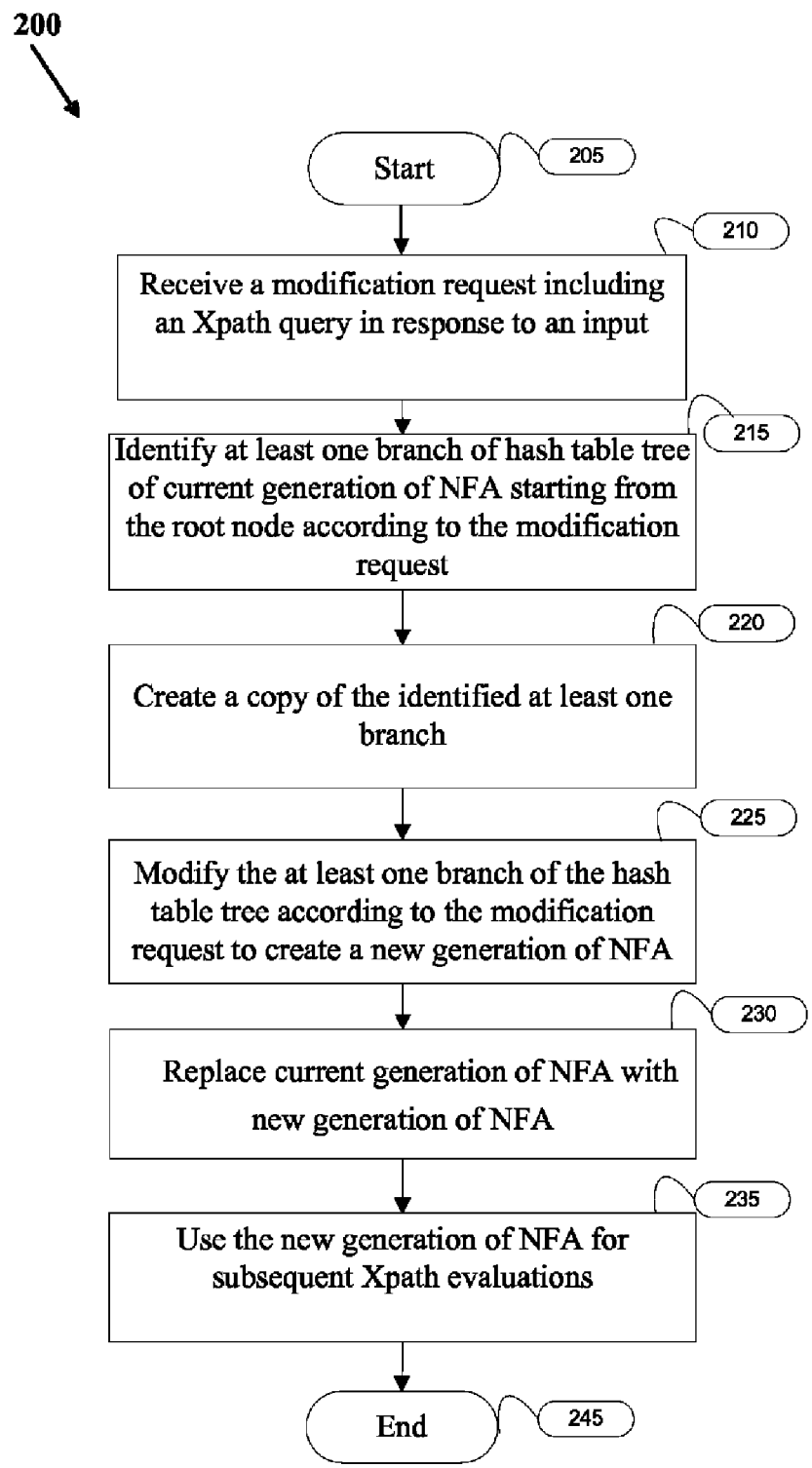
FIG: 2a

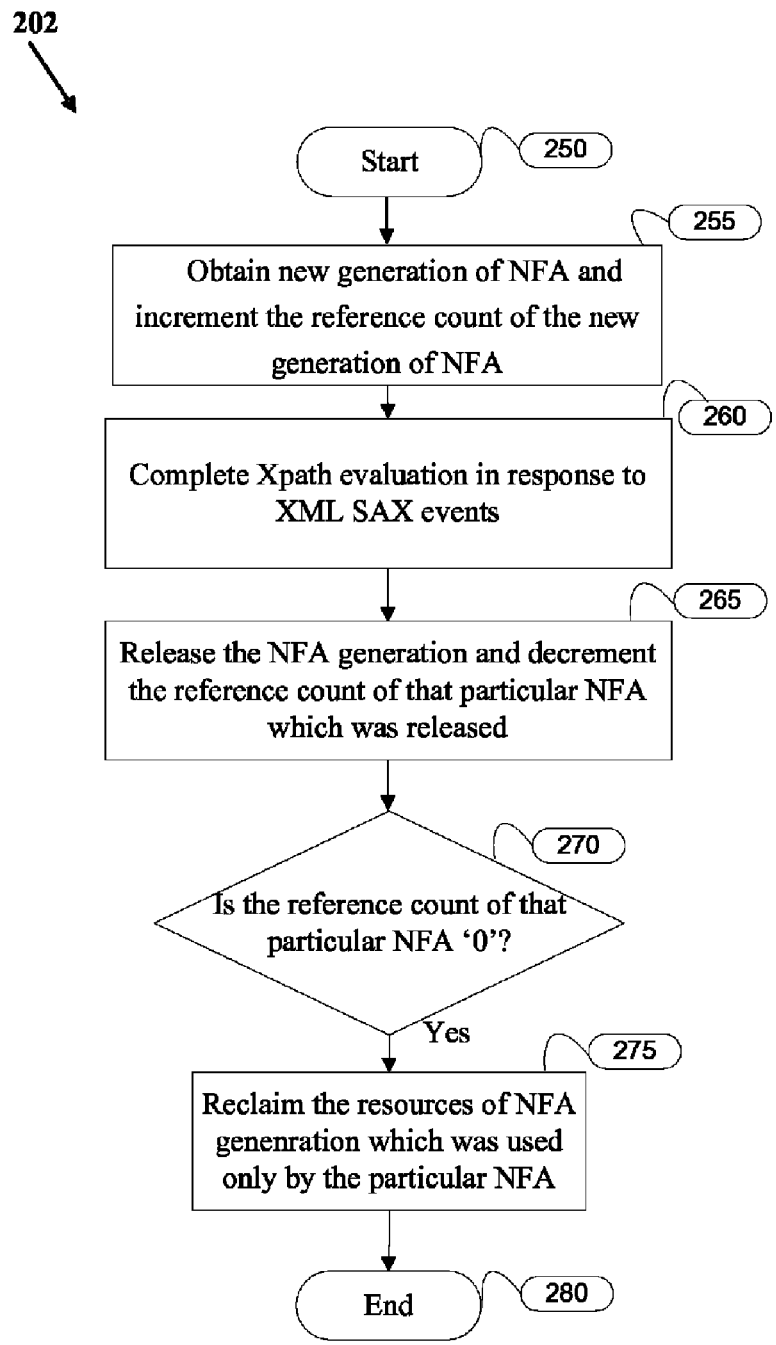
FIG: 2b

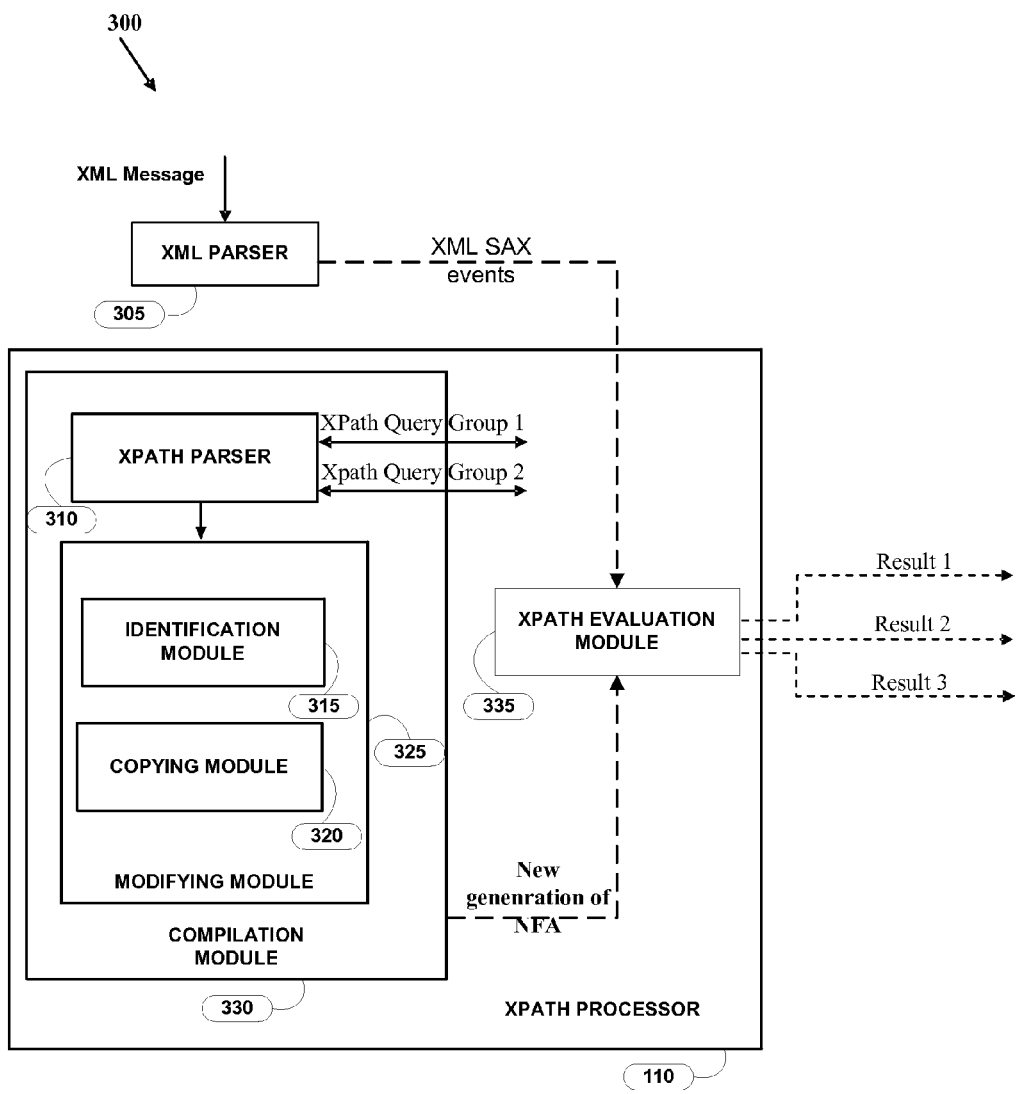
FIG: 3

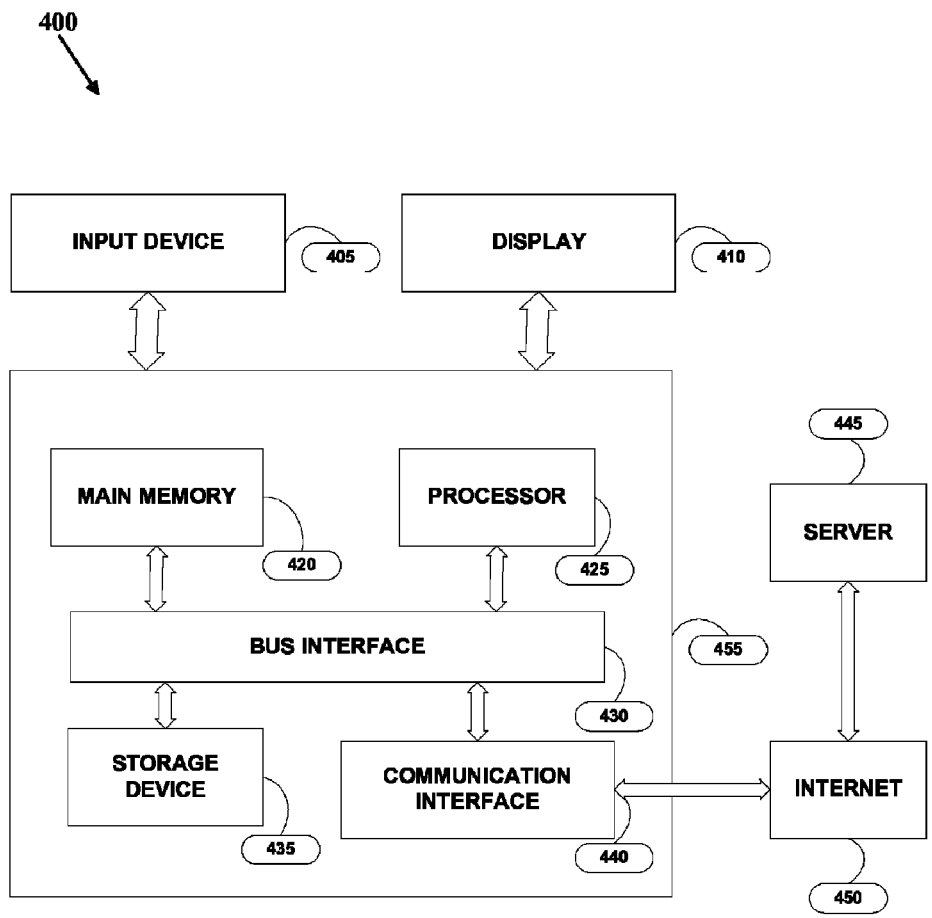
FIG: 4

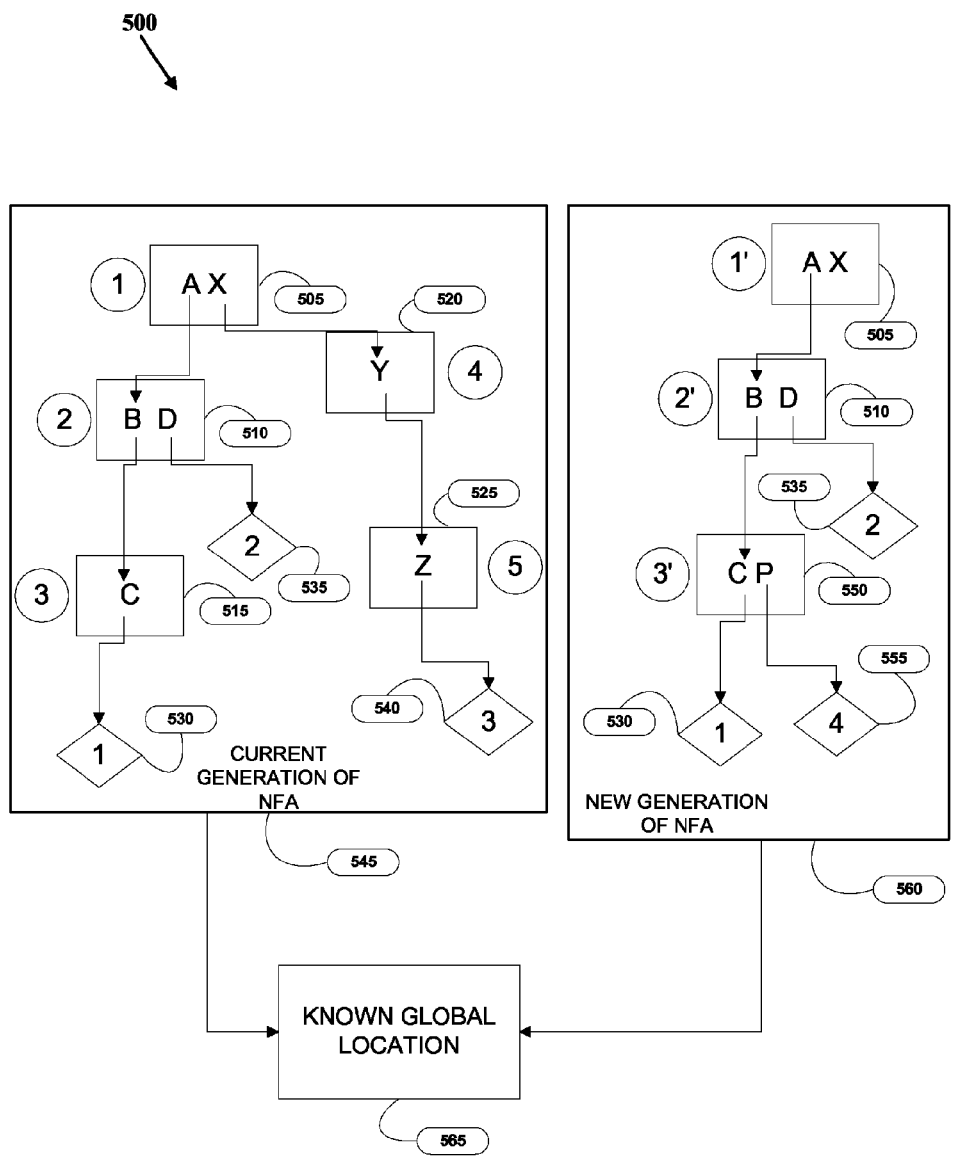
FIG: 5

DYNAMIC MODIFICATION OF XPATH QUERIES

COPYRIGHT

A portion of the disclosure of this patent document includes material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technical Field

Embodiments of the invention relate generally to information processing and more particularly to modification of Xpath queries in Xpath evaluation.

2. Prior Art

The continuing growth of the Internet has led to more and more data being exchanged over the Internet. Internet web sites and web pages are written in a code known as Hypertext Markup Language (HTML) code. HTML documents refer to a mode of displaying a document and are nothing but documents containing hyperlinks. However, HTML documents represent neither the logical structure nor the interrelationships of the data contained within such documents.

To address this shortcoming of HTML documents, Extensible Markup Language (XML) has evolved. XML is a standard for creating markup languages which describe the structure and interrelationships of underlying data contained within an HTML document. Thus, XML is not a single, predefined markup language rather a metalanguage (a language for describing other languages). In day to day commerce situations, an enterprise can use XML to define its business items. For example, items such as goods, prices, customers and so on can be defined using XML. Thus, XML in essence functions like a database of item records in a business scenario.

There are several ways in which XML documents can be processed and data retrieved therefrom. Languages such as XPath, XSLT and XQuery allow performing queries to XML documents to process such documents and locate information contained therein. XPath refers to a standardized language used for mining data from XML documents. XPath treats an XML document as a logical ordered tree and describes how to locate specific elements (and attributes, processing instructions, etc.) in an XML document.

In traditional approaches to XML processing, a Document Object Model (DOM) is followed. In DOM approach, a DOM parser converts the XML document to a tree format and stores this DOM tree in memory. While this approach works in case of smaller documents, it has severe limitations when it comes to processing of larger XML documents especially because the size of the document to be stored is usually 7-10 times the size of the original XML document. Thus, in case of large documents, following the DOM approach is a constraint in terms of memory, time, cost and application performance.

In order to address the challenges posed by DOM approach, alternative approaches such as Simple API for XML (SAX) have evolved. SAX refers to presenting the document as a serialized stream of events. In other words, SAX is event driven and relies on a programmer to specify a particular event. Upon the happening of such specified event, XML processing happens.

An XML filtering system comprises of an Xpath parser and a filtering engine. The XPath parser receives the Xpath queries, parses them and sends the parsed results to the filtering engine which is then converted into an internal representation. During XML processing, an online stream of XML messages are passed through a filtering engine which in turn matches XML documents to user inputted XPath queries and routes the matched XML documents according to XPath queries.

Various filtering approaches are known today, for example, 'X-filter' and 'Y-filter' algorithms.

According to Y-filter algorithm, a collection of Xpath queries form an Xpath query group which can be applied to the stream of incoming XML messages and can deliver results. Y-filter algorithm combines Xpath queries into a single Non-deterministic Finite Automaton (NFA) and exploits the commonality among the Xpath queries by merging common prefixes of the Xpath query paths such that they are processed at most once. NFA refers to the intermediate data structures generated by parsing Xpath queries. In general, before handling the XML SAX events, the XML filtering system parses the Xpath queries and generates NFA. An arriving XML document is parsed and the events (SAX based events) raised by the XML parser callback the handlers and drive the transitions in the NFA. Advantages of scalability in the approach and query path sharing are achieved by using automata-based filtering approaches.

Typically, in XML filtering systems, a need arises to modify Xpath queries in the Xpath query group when an Xpath evaluation is going on. This situation may occur when a user wants to modify Xpath queries in real-time and he or she wants the modified Xpath query group to be used for the Xpath evaluation. In conventional XML filtering systems, it is not possible to modify an Xpath query when an Xpath evaluation is occurring without interrupting the ongoing XPath evaluation. These conventional XML filtering systems allow modification of Xpath queries only when there is no Xpath evaluation occurring, i.e. an Xpath query can be added to or deleted from a running filtering engine only when the filtering engine is not actively engaged in processing an XML document. This property of the conventional XML filtering systems makes modification of Xpath queries impractical in a real-time environment.

Hence, there is a need to provide a method and system for modifying Xpath queries without interrupting an ongoing Xpath evaluation in a real-time environment.

SUMMARY

Embodiments of the invention described herein provide a computer implemented method, system and a machine-readable medium product for dynamically modifying Xpath queries during an ongoing Xpath (XML path language) evaluation of an Xpath query group on an online stream of Extensible Markup Language (XML) messages.

An exemplary embodiment of the invention provides a method for dynamically modifying Xpath queries during an Xpath evaluation. A modification request comprising at least one Xpath query in response to an input is received in an ongoing Xpath evaluation. An Xpath query group which is evaluated in the ongoing Xpath evaluation is modified according to the modification request without affecting the ongoing Xpath evaluation. A modification request includes a request for adding a new Xpath query to an Xpath query group, deleting an existing Xpath query from the Xpath query group and modifying an Xpath query in the Xpath query group.

An exemplary embodiment of the invention provides a system for dynamically modifying Xpath queries during an Xpath evaluation. The system includes an Xpath parser for receiving a modification request comprising at least one Xpath query in response to an input in an ongoing Xpath evaluation; and a modifying module for modifying an Xpath query group which is evaluated in the ongoing Xpath evaluation without affecting the ongoing Xpath evaluation. The modifying module further includes an identification module for identifying at least one branch of the data structure starting from the root node according to the modification request and a copying module for creating a copy of the identified at least one branch.

An exemplary embodiment of the invention provides a machine-readable medium product for dynamically modifying Xpath queries during an Xpath evaluation. The machine-readable medium product includes instructions operable to cause a programmable processor to perform receiving a modification request comprising at least one Xpath query in response to an input in an ongoing Xpath evaluation; and modifying an Xpath query group which is evaluated in the ongoing Xpath evaluation according to the modification request without affecting the ongoing Xpath evaluation.

Other aspects and example embodiments are provided in the Figures and the Detailed Description that follows.

BRIEF DESCRIPTION OF THE DRAWINGS

FIG. 1 is a block diagram of an environment in accordance with an embodiment of the invention;

FIG. 2a and FIG. 2b are flow diagrams illustrating a method for dynamically modifying Xpath queries according to an embodiment of the invention;

FIG. 3 is a block diagram illustrating an exemplary implementation of a system according to an embodiment of the invention;

FIG. 4 is a block diagram of an exemplary computer system upon which embodiments of the invention may be implemented; and FIG. 5 is a block diagram illustrating an example of Xpath query modification according to an embodiment of the invention.

DETAILED DESCRIPTION OF THE EMBODIMENTS

Embodiments of the invention described herein provide a computer implemented method, system and a machine-readable medium product for dynamically modifying Xpath queries during an ongoing Xpath evaluation of an Xpath query group on an online stream of XML messages.

FIG. 1 is a block diagram of an environment 100 according to an embodiment of the invention. Environment 100 includes an XML parser 105 and an XPath processor 110. XML parser 105 receives several online streams of XML messages, for example XML message 1. XML parser 105 may include an application program interface (API), for example, Simple API XML (SAX), for parsing XML messages. XML parser 105 parses the XML messages to create SAX events, for example, SAX event 1 to N as shown in FIG. 1. XML parser 105 sends the SAX events to XPath processor 110. XPath processor 110 also receives several XPath query groups from users. XPath query groups include Xpath queries which may include user profiles or preferences in XPath format.

XPath processor 110 evaluates XPath query groups on an online stream of XML messages. In an embodiment of the invention Xpath processor 110 evaluates the Xpath query groups on the parsed XML messages (SAX events). In an embodiment of the invention, XPath processor 110 may process one SAX event at a time, i.e. serially, and may evaluate several Xpath query groups on the SAX event. XPath processor 110 may parse the XPath queries to form a logically ordered data structure before evaluating XPath queries.

Embodiments of the invention are implemented based on Y-filter algorithm which allows simultaneous evaluation of a group of Xpath queries while parsing the XML message in a streaming mode using SAX events. Compiling an Xpath query group yields Nondeterministic Finite Automaton (NFA), which is a hash table tree according to the Y-filter algorithm? This NFA is used during the runtime of the Xpath processor 110 where Xpath queries are evaluated in response to XML SAX events.

FIG. 2a and FIG. 2b are flow diagrams illustrating a method for dynamically modifying Xpath queries according to an embodiment of the invention. FIG. 2a, 200 illustrates a method of an embodiment of the invention when the Xpath query group is compiled and modified. FIG. 2b, 202 is a flow diagram illustrating the method of an embodiment of the invention when the modified Xpath query group is evaluated. Referring now to FIG. 2a, the method 200 starts at step 205. At step 210, a modification request is received in response to an input in an ongoing Xpath evaluation of an Xpath query group. A modification request may include an Xpath query or an Xpath query group. Further, a modification request may include a request for adding a new Xpath query to the Xpath query group, and/or a request for deleting an existing Xpath query from the Xpath query group, and/or a request for modifying an existing Xpath query in the Xpath query group.

Upon receiving the modification request, Xpath parser parses the modification request. Parsed Xpath queries are stored as an NFA (current generation of NFA.) A current generation of NFA may include an Xpath query group which is being evaluated in the ongoing Xpath evaluation. As explained earlier, the current generation of NFA is maintained as a data structure. In one embodiment of the invention the data structure includes a hash table tree. It will be appreciated that any representations of a data structure may be used in the embodiments of the invention. At step 215, at least one branch of the hash table tree starting from the root node is identified. At step 220, a copy of the at least one branch of hash table tree identified at step 215 is created. It is noted that only those branches identified at step 215 are copied. At step 225, the copy is modified depending on the modification request and a new generation of NFA is created.

If a new Xpath query is to be added according to the modification request, identified branches of the hash table tree are modified and new branches are added to the hash table tree. If an existing branch is modified, the modification is performed on the copy of a current generation of NFA. An NFA generation is considered read-only and immutable. This property allows the continuous usage of an NFA generation even when modification is performed since modification is actually performed on the copy of that particular generation of NFA. Hence, an ongoing Xpath evaluation is not interrupted while Xpath queries are modified.

In an embodiment of the invention, several modification requests may be grouped as part of modification to a single atomic modification and modification can be performed simultaneously. In case of a single atomic modification, if a branch of the hash table tree from the root node is already copied as per a previous modification, and if a modification of the same hash table tree has to be performed subsequently, the branches of that hash table tree are not again copied. Further, subsequent modification is performed on the already copied branches of the hash table tree.

Upon modifying Xpath queries, at step 230, current generation of NFA is replaced by a new generation of NFA. At step 235, the new generation of NFA is used for subsequent Xpath evaluations, after which the method 200 ends at step 245.

FIG. 2b, 202 is a flow diagram illustrating the method of the embodiment of the invention when the modified Xpath query group is evaluated. Method starts at step 250. At step 255, the new generation of NFA is obtained and a reference count of the new generation of NFA is incremented. After incrementing the reference count, the Xpath evaluation is completed in response to the XML SAX events at step 260. At step 265, the NFA generation (current generation of NFA) is released and reference count of that particular NFA which was released is decremented. At step 270, an inquiry is made to check whether the reference count of the particular NFA is '0' (null). If the reference count is '0', the resources used only by the particular NFA are reclaimed at step 275. In one embodiment of the invention, the resources are reclaimed if the particular generation of NFA has no other older generation of NFA. For example, consider a root node 'R' having a left child 'C1' and a right child 'C2'. If modification has to be performed on the branch 'R' and 'C1', that particular branch is copied and a new NFA generation is created. If the reference count is not '0' at step 270, it implies that other Xpath processors are currently using that particular generation of NFA or it may also imply that the particular generation of NFA is the latest generation of NFA. Method ends at step 280.

Using embodiments of the invention, XPath queries can be added to the NFA, and/or existing XPath queries can be deleted from the NFA even when there are several users using that NFA at any particular instant. The algorithm is lockless and enables modification of a generation of NFA without locking or stopping an ongoing XPath evaluation, and yields a new generation of NFA once the modification is complete. Upon modifying Xpath queries, new group of XPath queries is used on subsequent XML messages received.

Modifying a current generation of NFA yields a new generation of NFA without modifying current generation NFA. This enables the users whose transactions are still in-flight to continue to use the current generation of NFA whereas any new user can start using the new generation of NFA if it is present. Once the users are completely finished using a particular NFA and if that is an old generation NFA, it is deleted freeing only those resources that are no longer needed. The method of this embodiment of the invention allows seamless modification of Xpath queries during an ongoing Xpath evaluation.

The method described above includes different steps involved in evaluating XPath queries. The method may include a greater or a fewer number of steps than those included in FIG. 2a and FIG. 2b.

One or more steps of the method described in FIG. 2a and FIG. 2b may be implemented using a computer system. The computer system is explained in details in conjunction with FIG. 4.

FIG. 3 is a block diagram illustrating an exemplary implementation of a system 300 according to an embodiment of the invention. The system 300 includes an XML parser 305 and an Xpath processor 110. The Xpath processor 110 further includes an Xpath evaluation module 335 and a compilation module 330. Compilation module 330 further includes an Xpath parser 310, and a modifying module 325. Modifying module 325 further includes an identification module 315 and a copying module 320. In one embodiment of the invention the Xpath evaluation module 335 may be located outside the Xpath processor 110.

Xpath Parser 310 parses several Xpath query groups (Xpath query group 1, Xpath query group 2 as shown in FIG. 3) and sends the parsed queries (compiled NFA) to the modifying module 325. Xpath parser 310 generates intermediate data structures such as query trees and NFA. Compiled NFA (current generation of NFA) includes hash table tree representation of Xpath queries. Hash table tree approach provides low time complexity for inserting or deleting states and transitions. The ease of maintenance is a key benefit of hash table tree approach that provides easy modification of Xpath query groups. Further, identification module 315 identifies the branches of the hash table tree starting from the root node of the hash table tree according to the modification request. As explained earlier, a modification request may include a request for adding a new Xpath query to the Xpath query group, and/or a request for deleting an existing Xpath query from the Xpath query group, and/or a request for modifying an existing Xpath query in the Xpath query group. Copying module 320 creates a copy of the branches identified by identification module 315. Further, the copy is modified according to the modification request. Modification of an Xpath query group generates a new generation of NFA.

The output of compilation module 330, i.e. the new generation of NFA, is provided to the Xpath evaluation module 335. Xpath evaluation module 335 also receives parsed XML message from XML parser 305. XML parser 305 receives the XML messages and parses them using SAX events and sends the XML SAX events to the Xpath evaluation module 335. Xpath evaluation module 335 matches the Xpath queries over the XML message and outputs the matched results, e.g. result 1, result 2, result 3 shown in FIG. 3.

Copying module 320, identification module 315 and modifying module 325 may include one or more algorithms.

The system 300 described above may include a greater or a fewer number of modules than those included in FIG. 3.

FIG. 4 is a block diagram of an exemplary computer system 400 upon which various embodiments of the invention may be implemented. Computer system 400 includes a processing unit 455 including a main memory 420, such as a Random Access Memory (RAM) or other dynamic storage device, coupled to a bus interface 430 for storing information and instructions to be executed by processor 425. A storage device 435, such as a magnetic disk or optical disk, is provided and coupled to bus interface 430 for storing information and instructions. Computer system 400 may be coupled via bus interface 430 to a display 410 for displaying information to a user. An input device 405, including alphanumeric and other keys, is coupled to bus interface 430 for communicating information and command selections to processor 425.

Embodiments of the invention are related to the use of computer system 400 for implementing the techniques described herein. According to one embodiment of the invention, those techniques are performed by computer system 400 in response to processor 425 executing one or more sequences of one or more instructions included in main memory 420. Such instructions may be read into main memory 420 from another machine-readable medium product, such as storage device 435. Execution of the sequences of instructions included in main memory 420 causes processor 425 to perform the method embodiment of the invention described herein. In alternative embodiments, hard-wired circuitry may be used in place of or in combination with software instructions to implement the invention. Thus, embodiments of the invention are not limited to any specific combination of hardware circuitry and software.

In an embodiment implemented using computer system 400, various machine-readable medium products are involved, for example, in providing instructions to processor 425 for execution. Computer system 400 also includes a communication interface 440 coupled to bus interface 430. Communication interface 440 provides a two-way data communication coupling to internet 450 that is coupled a server 445. Server 445 might transmit a requested code for an application program through internet 450 and communication interface 440.

FIG. 5 is a block diagram 500 illustrating an example of Xpath query modification according to an embodiment of the invention. Consider an example of three Xpath queries namely '/a/b/c', '/a/d', and '/x/y/z' represented as a current generation of NFA 545 in FIG. 5. As explained earlier, NFA includes hash table tree representation of Xpath queries. Any hash table includes a key and a value. A value is a pointer pointing to another hash table. In this example hash table 1, 505 includes key 'a' and value 'x'. Value 'a' is pointing to hash table 2, 510 having 'b' and 'd' as key and value respectively. Key 'b' is pointing to hash table 3, 515 to value 'c'. Value 'c' is pointing to an accepting state, path ID list '1', 530. If there are several queries driving a same path, the identical queries will be a list of accepting states. In a similar way 'd' is pointing to an accepting state with path ID list '2', 535. Value 'x' is pointing to another hash table 4, 520 having value 'y' and 'y' is pointing to another hash table 5, 525 having value 'z'. Value 'z' is pointing to an accepting state with path ID list '3', 540.

Now consider a modification request to add a new query '/a/b/p' to the current generation of NFA 545. Embodiments of the invention identify and copy the particular branch of hash table tree which includes hash tables 1, 2 and 3 (505, 510 and 515). The copied hash tables after modification are named as hash tables 1', 2' and 3' (570, 575 and 550). It is noted that while copying the hash table tree branch, value 'x' in hash table 1, 505 is pointing to value 'y' in hash table 4, 520. The new value 'p' is added to hash table 3', 550. Now value 'b' in hash table 3' (550) is pointing to value 'c' and value 'p' in hash table 3' (550). Value 'c' and value 'p' are pointing to accepting states with path ID lists 1 and 4 (530, 555) respectively. The modified branch of NFA becomes the new generation of NFA 560.

According to an embodiment of the invention, the hash tables preceding a modified hash table including the root node also have to be modified to point to the modified hash table. In this example, after modifying hash table 3, 515 (which becomes 3' (550) after modification), value 'b' in hash table 2, 510 is still pointing to hash table 3, 515 and hence hash table 2, 510 has to be modified to point to hash table 3', 550. To complete modification, hash table 2, 510 is modified to point to 3', 550 (modified hash table is named as 2' (575) in FIG. 5) and hash table 1, 505 is modified to point to 2', 510 (modified hash table is named as 1' (570) in FIG. 5). Current generation of NFA 545 is stored in a known global location 565. The current generation of NFA 545 is updated with the new generation of NFA 560 in the known global location 565. Before an Xpath processor starts evaluating Xpath queries, the latest generation of NFA is accessed from the known global location 565.

An exemplary algorithm for dynamic modification is shown herein in pseudo-code. The pseudo-code is written in XML language and as an exemplary implementation of the embodiments of the invention.

Algorithm: Modification of an XPath query group.
Input: Current generation of NFA.
List of XPath queries to be added.
List of XPath query ids to be deleted.
Output: A new generation of NFA containing the modification if successful.
On failure the current generation of NFA remains unchanged.
set pOldNfa to pCurNfa
if pOldNfa is NULL
   Create new Root Nfa Node in pNewNfa.
   Add Root Nfa Node to NewNodeMap(NULL, RootNode)
   Set NewNfaNode to Root Node of pNewNfa
else
   Copy Root NFA node to NewNfaNode
   Add NewNfaNode to NewNodeMap(OldRootNode, NewNfaNode)
   Set Root Node of pNewNfa to NewNfaNode
for each XPath query to be added
   for each LocationPath in the XPath query
   Identify the NFA nodes to be modified in pOldNfa
   Collect such NFA nodes in a list called NodeModificationList
   for each NFA node in NodeModificationList
     if NFA node not in NewNodeMap
       Copy NFA node to NewNfaNode
       Add NewNfaNode to NewNodeMap(OldNfaNode, NewNfaNode)
     Modify NewNfaNode by adding the required new entry
for each XPath query id to be deleted
   Obtain XPath query datastructure using the query id
   for each LocationPath in the XPath query
   Identify the NFA nodes to be modified in pOldNfa
   Collect such NFA nodes in a list called NodeModificationList
   for each NFA node in NodeModificationList
     if NFA node not in NewNodeMap
       Copy NFA node to NewNfaNode
       Add NewNfaNode to NewNodeMap (OldNfaNode, NewNfaNode)
     Modify NewNfaNode by deleting the required entry.
Make OldNfaNodeList with OldNfaNodes present in NewNodeMap.
if OldNfaNodeList is not empty
   pOldNfa->NodeToFreeList=OldNfaNodeList
if pOldNfa is NOT NULL
   pOldNfa->pNextGenerationNfa=pNewNfa
   Increment ReferenceCount of pNewNfa
Replace pCurNfa at known global location with pNewNfa.

The algorithm takes the old generation of NFA as a current generation of NFA by using set pOldNfa to pCurNfa. A check is performed to find whether there are existing Xpath queries in the pOldNfa. If there is no old generation of NFA, a new root NFA node is created in pnewNfa. Further, the new root NFA node is added to the map NewNodeMap with key as NULL and value as Rootnode. Now, NewNfaNode is set to the root node of pNewNfa. On the other hand, if there are Xpath queries in the pOldNfa, root NFA node is copied to NewNfaNode and NewNfaNode is added to the map NewNodeMap with OldRootNode as key and NewNfaNode as value.

If the modification request includes a request to add a new Xpath query to the NFA, for each LocationPath in the XPath query, the NFA nodes to be modified are identified in pOldNfa. Such NFA nodes are collected in a list called NodeModificationList. For each NFA node in the NodeModificationList, NFA node is copied to the NewNfaNode provided if NFA node is not in NewNodeMap. This NewNfaNode is added to the map NewNodeMap with OldNfaNode and NewNfaNode as key and value respectively. The NewNfaNode is modified by adding the required entry.

If the modification request includes a request to delete an existing Xpath query from the NFA, the XPath query data structure is obtained using the query id. For each LocationPath in the XPath query, the NFA nodes to be modified are identified in pOldNfa. Such NFA nodes are collected in a list called NodeModificationList. For each NFA node in the NodeModificationList, the NFA node is copied to NewNfaNode if NFA node is not in NewNodeMap, and NewNfaNode is added to the map NewNodeMap (OldNfaNode, NewNfaNode). The NewNfaNode is modified by deleting the required entry. The old NFA nodes copied are freed by pOldNfa whenever pOldNfa is freed. If pOldNfa is present, pOldNfa holds a reference to its next NFA generation which is pNewNfa. This ensures that a NFA will not be freed if the NFA's old generation still exists. In other words the oldest generation of NFA will always be freed first. After modification pCurNfa is replaced with pNewNfa in the known global location.

The forgoing description sets forth numerous specific details to convey a thorough understanding of the invention. However, it will be apparent to one skilled in the art that the invention may be practiced without these specific details. Well-known features are sometimes not described in detail in order to avoid obscuring the invention. Other variations and embodiments are possible in light of above teachings, and it is thus intended that the scope of invention not be limited by this Detailed Description, but only by the following Claims.

What is claimed is:

1. A computer implemented method comprising:
performing, by a processor, a first Xpath evaluation on a stream of Extensible Markup Language (XML) messages, the first Xpath evaluation based on a group of Xpath queries associated with a first user transaction;
receiving, by a processor, a plurality of requests to modify the Xpath query group and combining the plurality of requests into a single atomic modification; and
modifying, by a processor, the Xpath query group, in a persistent manner, without affecting the ongoing first Xpath evaluation on the XML messages, wherein modifying the Xpath query group comprises:
generating a second data structure as a copy of portions of a first data structure, the first data structure comprising a hash table with branches, the branches derived from the group of Xpath queries prior to modification and only copying branches of the first data structure being modified;
altering at least one branch of the second data structure in accordance with the modification request, wherein the single atomic modification modifies the second data structure to perform a subsequent Xpath evaluation corresponding to a subsequent modification request of the plurality of requests without generating an additional data structure;
performing a second Xpath evaluation, associated with a second user transaction, using the second data structure in substantially real time with the first Xpath evaluation such that the first and second user transactions are overlapping; and
deleting the first data structure upon completion of the first user transaction and using the second data structure for additional user transactions until modified.

2. The computer implemented method of claim 1, wherein said modifying comprises:
generating a current generation of Nondeterministic Finite Automaton (NFA) by compiling said Xpath query group, said current generation of NFA maintained as a data structure;
identifying at least one branch of said data structure starting from the root node according to the modification request;
creating a copy of the identified at least one branch of the data structure;
modifying said copy to create a new generation of NFA further comprising modifying said at least one branch of the data structure starting from the root node; and
using said new generation of NFA for subsequent Xpath evaluations.

3. The computer implemented method of claim 1, wherein said receiving the modification request comprises receiving a request for:
adding a new Xpath query to the Xpath query group.

4. The computer implemented method of claim 1, wherein said receiving the modification request comprises receiving a request for:
deleting an existing Xpath query from the Xpath query group.

5. The computer implemented method of claim 3, wherein said adding a new Xpath query comprises adding a new branch to the data structure.

6. The computer implemented method of claim 2, wherein said data structure comprises a hash table tree.

7. The computer implemented method of claim 2 further comprising:
using the current generation of NFA for the ongoing Xpath evaluation; and
deleting the current generation of NFA after completing the ongoing Xpath evaluation once it is no longer required and reclaiming the resources used by the current generation of NFA.

8. The computer implemented method of claim 1, wherein said modifying comprises modifying Xpath queries serially.

9. A computer implemented system least partially implemented in hardware, comprising:
an Xpath parser configured to perform a first Xpath evaluation on a stream of Extensible Markup Language (XML) messages using a processor, the first Xpath evaluation based on a group of Xpath queries associated with a first user transaction, the Xpath parser configured to receive a plurality of requests to modify the Xpath query group and combining the plurality of requests into a single atomic modification; and
a modifying module configured to modify an Xpath query group, in a persistent manner, without affecting the ongoing Xpath evaluation on the XML messages, wherein the modifying module is further configured to generate a second data structure as a copy of a portion of a first data structure, the first data structure comprising a hash table with branches, the branches derived from the group of Xpath queries prior to modification and only copying branches of the first data structure being modified, the modifying module configured to alter at least one branch of the second data structure in accordance with the modification request, wherein the single atomic modification modifies the second data structure to perform a subsequent Xpath evaluation corresponding to a subsequent modification request of the plurality of requests without generating an additional data structure, the modifying module configured to perform a second Xpath evaluation, associated with a second user transaction, using the second data structure in substantially real time with the first Xpath evaluation such that the first and second user transactions are overlapping, and deleting the first data structure upon completion of the first user transaction and using the second data structure for additional user transactions until modified.

10. The computer implemented system of claim 9, wherein said modifying module comprises:
    an identification module for identifying, in a current generation of Nondeterministic Finite Automaton (NFA) said current generation of NFA comprising compiled Xpath query group maintained as a data structure, at least one branch of said data structure starting from root node according to the modification request; and
    a copying module for creating a copy of the identified at least one branch of the data structure.

11. The computer implemented system of claim 10, wherein said modifying module modifies said at least one branch of the data structure.

12. The computer implemented system of claim 9, wherein said modification request comprises a request for:
    adding a new Xpath query to said Xpath query group.

13. The computer implemented system of claim 9, wherein the modification request comprises a request for:
    deleting an existing Xpath query from the Xpath query group.

14. A non-transitory machine-readable medium product, comprising instructions operable to cause a programmable processor to perform:
    performing, by the processor, a first Xpath evaluation on a stream of Extensible Markup Language (XML) messages, the first Xpath evaluation based on a group of Xpath queries associated with a first user transaction;
    receiving, by the processor, a plurality of requests to modify the Xpath query group and combining the plurality of requests into a single atomic modification; and
    modifying, by the processor, the Xpath query group, in a persistent manner, without affecting the ongoing first Xpath evaluation on the XML messages, wherein modifying the Xpath query group comprises:
    generating a second data structure as a copy of portions of a first data structure, the first data structure comprising a hash table with branches, the branches derived from the group of Xpath queries prior to modification and only copying branches of the first data structure being modified;
    altering at least one branch of the second data structure in accordance with the modification request, wherein the single atomic modification modifies the second data structure to perform a subsequent Xpath evaluation corresponding to a subsequent modification request of the plurality of requests without generating an additional data structure;
    performing a second Xpath evaluation, associated with a second user transaction, using the second data structure in substantially real time with the first Xpath evaluation such that the first and second user transactions are overlapping; and
    deleting the first data structure upon completion of the first user transaction and using the second data structure for additional user transactions until modified.

15. The machine-readable medium product of claim 14, wherein said modifying comprises:
    generating a current generation of Nondeterministic Finite Automaton (NFA) by compiling said Xpath query group, said current generation of NFA maintained as a data structure;
    identifying at least one branch of said data structure starting from the root node according to the modification request;
    creating a copy of the identified at least one branch of the data structure;
    modifying said copy to create a new generation of NFA further comprising modifying said at least one branch of the data structure starting from the root node; and
    using said new generation of NFA for subsequent Xpath evaluations.

16. The machine-readable medium product of claim 14, wherein said modification request comprises a request for:
    adding a new Xpath query to said Xpath query group.

17. The machine-readable medium product of claim 14, wherein the modification request comprises a request for:
    deleting an existing Xpath query from the Xpath query group.

* * * * *